** 3,047,413
FAST SURFACE-DRY OIL EMULSION PAINT
Arthur W. Schwab and Howard M. Teeter, Peoria, Ill.,
assignors to the United States of America as represented by the Secretary of Agriculture
No Drawing. Filed Aug. 15, 1960, Ser. No. 49,803
1 Claim. (Cl. 106—170)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to greatly improved linseed oil emulsion paints which are comparable in properties to the synthetic resin emulsion paints. Films of our novel ionic and nonionic formulations surface-dry very quickly, thus permitting almost immediate touch-up or recoating, and as soon as the surface-dry has occurred they exhibit a remarkable lessening of the well known water-sensitivity of ionic paint formulations, thus usually making it possible for an outdoors application to be interrupted by a brief to moderate shower without harm or washing off. Despite the known great water sensitivity of the prior art ionic emulsion coating compositions as compared with similar nonionic formulations, the former are marketed because of their greater stability to freezing and thawing.

A principal object of this invention, therefore, is the preparation of an unsaturated vegetable oil emulsion coating composition which is particularly suitable for outdoor application because it exhibits a rapid surface dry and then has a markedly improved water resistance. A further object is a formulation which before drying may be readily washed from the brush in a stream of tap water. Other advantages will appear hereinafter.

The above and other objects of this invention are accomplished by adding to an oil emulsion paint formation comprising a necessary amount of pigment solids a thickening agent such as hydroxyethyl cellulose in much higher concentrations than would be predicted as permitting a useable viscosity.

By the very nature of their application to surfaces of varied description, extent, and contour, paints conventionally are formulated to have a viscosity range of about 1000–5000 cps. for use. The use of thickening agents in coating compositions is known in the art but the proportions employed for this purpose do not exceed 1 percent, especially since the large inorganic solids content (pigments, antifungals, etc.) also add thereto. Since, as is well known, the viscosity of a 1 percent solution of a certain grade of a commercial brand hydroxyethyl cellulose is about 300 cps. and that of a 2.5 percent aqueous solution is greater than 10,000 cps., it would appear impossible to incorporate the latter proportion (based on the water) in an oil emulsion paint formulation and have the viscosity range required for flowability.

In the present invention we have discovered that by including in the neighborhood of at least about 4 percent (based on the water used for preparing the unpigmented emulsion) of an organic thickener such as hydroxyethyl-cellulose in an oil emulsion paint composition comprising about 56 percent of solids and a highly bodied linseed oil, we retain a thoroughly useable viscosity and achieve unexpectedly improved surface-dry and water-resistance. These improved effects are obtained to some extent with non-ionic formulations but are exceptionally pronounced in the ordinarily highly water-sensitive ionic formulations.

The following examples show that the addition of the said critical minimum and unobvious proportion of hydroxyethyl-cellulose to oil emulsion coating compositions containing a highly bodied linseed oil and about 56 percent of solids provides novel and useful properties.

We have also prepared formulations employing larger proportions of HEC (up to 5 percent, based on the water in the emulsion vehicle) with similar results in surface-dry acceleration and ease of removal from the brush. Naturally, although the latter compositions too are thixotropic, their viscosities are so high as to remove them from the ordinary definition of a paint. Despite this, however, they retain such low yield values that application by brushing remains feasible although not preferred.

*Example 1.—Ionic Emulsion*

A pre-mix consisting of 3 gm. polyoxyethylene sorbitan trioleate containing about 26–27 moles of ethylene oxide, 2 gm. sorbitan monolaurate and 1 gm. sorbitan trioleate was mixed with 150 ml. distilled water in a household mixer. Then a dry pre-mix consisting of 16 gm. potassium dimerate (the potassium hydroxide salt of the $C_{36}$ dibasic acid made by the dimerization of polyunsaturated fatty acids) and 1.3 gm. trisodium phosphate dodecahydrate was slowly added and mixed. To the foregoing, 6 gms. of a commercial grade of hydroxyethyl cellulose which, in a 2 percent aqueous solution at 20° C. has a viscosity of 3500–5000 cps., was slowly added in small portions while mixing. Another pre-mix consisting of 180 gm. highly bodied linseed oil having a Gardner-Holdt viscosity of $Z_9$— which is known in the trade as a 37 minute oil, 7.6 gm. lead naphthenate, and 3.1 gm. cobalt naphthenate was then added in a thin stream while mixing first slowly and then rapidly. This emulsion was found to have a pH of 8.5, an average oil particle size of 2 to 3 microns, and a Brookfield viscosity of 1800 cps. at 20 r.p.m. and 25° C.

*Example 2.—Ionic Emulsion Paint*

While the ionic emulsion of Example 1 was being mixed a pigment slurry for addition thereto was separately prepared in a Waring Blendor by mixing 172 gm. titanium dioxide (rutile), 20 gm. potassium aluminosilicate muscovite mica, 20 gm. aluminum silicate, 3.5 gm. of a 25 percent solution of the sodium salt of a condensed aryl sulfonic acid, 1.4 gm. of an alkyl aryl polyether alcohol having 12–13 moles of ethylene oxide, 189 ml. distilled water, and 1.9 gm. of condensed polyalcohol-fatty esters. This slurry was added to the emulsion of Example 1 and mixed well. The paint containing 56 percent solids, was found to have a pH of 8.5, a Brookfield viscosity of 3900 cps. at 20 r.p.m., and an average oil particle size of 2 to 4 microns. Films thereof tested by the "sand trail" tests of Sanderson (Proc. A.S.T.M., 25, part II, 407 (1925) and ibid., 26, part II, 556 (1926) were dry to touch in approximately ½ hour and tack-free in about 2¼ hours. We also tested films of the above paint by a reproducible "water test" in which 5200 ml. of water contained in a reservoir was released to fall freely in 1 minute from a spigot located 6 inches above glass slides bearing films which had been applied at a thickness of 5 mls. and then air dried at room temperature for different intervals. Although films which had dried for only 2 hrs. failed this test, films which had dried for 3 hrs. were unaffected. By contrast, films cast from an identical formulation excepting that a conventional resinous thickener, namely ammonium polyacrylate was substituted for the hydroxyethyl cellulose, failed this test even after drying for 8 hrs.

*Example 3.—Nonionic Emulsion*

This emulsion was prepared precisely as that of Example 1, excepting that nonylphenoxypolyoxyethylene ethanol containing 8–9 moles of ethylene oxide was substituted for the potassium dimerate and the trisodium phosphate dodecahydrate was omitted. The emulsion was found to have a pH of 6.9, a Brookfield viscosity of 1900 cps. at 20 r.p.m., and an average oil particle size of 3 to 6 microns.

*Example 4.—Nonionic Emulsion Paint*

A paint comprising 56 percent solids was prepared in the same manner as the paint of Example 2 by preparing a pigment slurry precisely as was the pigment slurry of Example 2 excepting that the alkyl aryl polyether alcohol and the condensed polyalcohol fatty esters were omitted. The Brookfield viscosity at 20 r.p.m. was found to be 6800 cps., the pH was 7.1, and the average oil particle size was 2 to 3 microns. "Sand-trail" tests showed that films were dry to touch in approximately 15 minutes and tack free in about 2¼ hours.

Having thus disclosed our invention, we claim:

An ionic paint composition, washable from a paint brush in running water and which will, when in a film, air dry to touch at room temperature in about 10–30 minutes, consisting essentially of a potassium dimerate-assisted pH 8.5 aqueous emulsion of a highly bodied linseed oil having a Gardner-Holdt viscosity of $Z_9-$, the linseed oil being the only film forming ingredient of the composition, finely divided pigment solids suspended in the emulsion, a naphthenate dryer, and about 4 percent based on the water, of hydroxyethyl cellulose, said hydroxyethyl cellulose being of such viscosity grade that a 1 percent aqueous solution thereof has a viscosity of about 300 cps.

References Cited in the file of this patent

UNITED STATES PATENTS

| | | |
|---|---|---|
| 2,321,270 | Bacon et al. | June 8, 1943 |
| 2,342,581 | Hoffman | Feb. 22, 1944 |
| 2,567,722 | Marberg et al. | Sept. 11, 1951 |
| 2,591,904 | Zola | Apr. 8, 1952 |
| 2,737,458 | Burnham | Mar. 6, 1956 |
| 2,778,740 | Armstrong | Jan. 22, 1957 |